US012719376B2

(12) United States Patent
Calabrese et al.

(10) Patent No.: US 12,719,376 B2
(45) Date of Patent: Aug. 25, 2026

(54) LOW FORWARD VOLTAGE DROP PASSIVE FULL-BRIDGE RECTIFIER ARCHITECTURES

(71) Applicant: TEXAS INSTRUMENTS INCORPORATED, Dallas, TX (US)

(72) Inventors: Giacomo Calabrese, Freising (DE); Nicola Bertoni, Freising (DE); Sooping Saw, McKinney, TX (US); Taisuke Kazama, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 994 days.

(21) Appl. No.: 17/680,722

(22) Filed: Feb. 25, 2022

(65) Prior Publication Data

US 2022/0407425 A1 Dec. 22, 2022

Related U.S. Application Data

(60) Provisional application No. 63/213,598, filed on Jun. 22, 2021.

(51) Int. Cl.
*H02M 3/335* (2006.01)

(52) U.S. Cl.
CPC ............................... *H02M 3/33569* (2013.01)

(58) Field of Classification Search
CPC ......... H02M 3/33569; H02M 3/33573; H02M 1/123; H02M 1/088; H02M 3/33592
See application file for complete search history.

(56) References Cited

U.S. PATENT DOCUMENTS 5,594,371 A * 1/1997 Douseki ................. H10D 86/00 326/122
7,199,617 B1 * 4/2007 Schrom .......... H03K 19/018528 327/333
7,391,196 B2 * 6/2008 Fosler ............... H02M 3/33571 323/283
7,411,318 B2 * 8/2008 Kimura ............ H03K 19/01728 327/380
9,130,478 B2 * 9/2015 Feldtkeller ............ H02M 7/219
9,711,207 B2 * 7/2017 Hush .................... G11C 7/1012
10,090,769 B2 * 10/2018 Baranwal .......... H02M 3/33592
10,511,273 B2 * 12/2019 Al-Shyoukh ......... H02M 5/458
10,601,332 B2 * 3/2020 Granato ............ H02M 3/33592
10,622,908 B2 * 4/2020 Granato ............ H02M 3/33592
10,826,334 B2 * 11/2020 Pentakota ........... H02M 3/3385
10,852,756 B2 * 12/2020 Luria ......................... G05F 1/56
11,336,193 B2 * 5/2022 Granato ................ H02M 1/088

(Continued)

*Primary Examiner* — Thienvu V Tran
*Assistant Examiner* — Yahveh Comas Torres
(74) *Attorney, Agent, or Firm* — Zhenhai Fu; Frank D. Cimino

(57) ABSTRACT

A rectifier circuit includes a first diode-connected transistor coupled to a first voltage terminal and a second diode-connected transistor coupled to a second voltage terminal. A switch network is coupled between the first diode-connected transistor and the second diode-connected transistor. The switch network has a first switch network terminal adapted to be coupled to a first terminal of a secondary winding of a transformer and has a second switch network terminal adapted to be coupled to a second terminal of the secondary winding of the transformer.

17 Claims, 4 Drawing Sheets

(56) References Cited

U.S. PATENT DOCUMENTS

| | | | | |
|---|---|---|---|---|
| 2014/0254224 | A1* | 9/2014 | Feldtkeller | H02M 7/219<br>363/127 |
| 2015/0357022 | A1* | 12/2015 | Hush | G11C 11/4093<br>365/72 |
| 2018/0152109 | A1* | 5/2018 | Baranwal | H02M 1/083 |
| 2019/0089263 | A1* | 3/2019 | Granato | H02M 3/33573 |
| 2019/0181817 | A1* | 6/2019 | Al-Shyoukh | H02M 7/797 |
| 2020/0183438 | A1* | 6/2020 | Collins | G05F 3/20 |

* cited by examiner

LOW FORWARD VOLTAGE DROP PASSIVE FULL-BRIDGE RECTIFIER ARCHITECTURES

CROSS-REFERENCE TO RELATED APPLICATIONS

This application claims priority to U.S. Provisional Application No. 63/213,598, filed Jun. 22, 2021, which is hereby incorporated by reference.

BACKGROUND

A power converter is an electrical circuit (e.g., an integrated circuit, IC) that receives input electrical power and generates output electrical power derived from the input power. Some power converters are isolated converters which include a galvanic barrier between the input and the output. A galvanic isolation barrier lacks a direct electrical connection. One type of galvanic isolation barrier is a transformer, which has two inductors—a primary coil for the input and a secondary coil for the output—and there is no direct electrical connection between the primary and secondary cons. Isolated power converters have a wide variety of applications such as in controller area networks (CANs), power supply start-up bias and gate drives, isolated sensor interfaces, etc.

SUMMARY

In one example, a rectifier circuit (e.g., usable as part of an isolation converter) includes a first diode-connected transistor coupled to a first voltage terminal and a second diode-connected transistor coupled to a second voltage terminal. A switch network is coupled between the first diode-connected transistor and the second diode-connected transistor. The switch network has a first switch network terminal adapted to be coupled to a first terminal of a secondary winding of a transformer and has a second switch network terminal adapted to be coupled to a second terminal of the secondary winding of the transformer.

BRIEF DESCRIPTION OF THE DRAWINGS

The same reference number is used in the drawings for the same or similar (either by function and/or structure) features.

DETAILED DESCRIPTION

Figure 1:
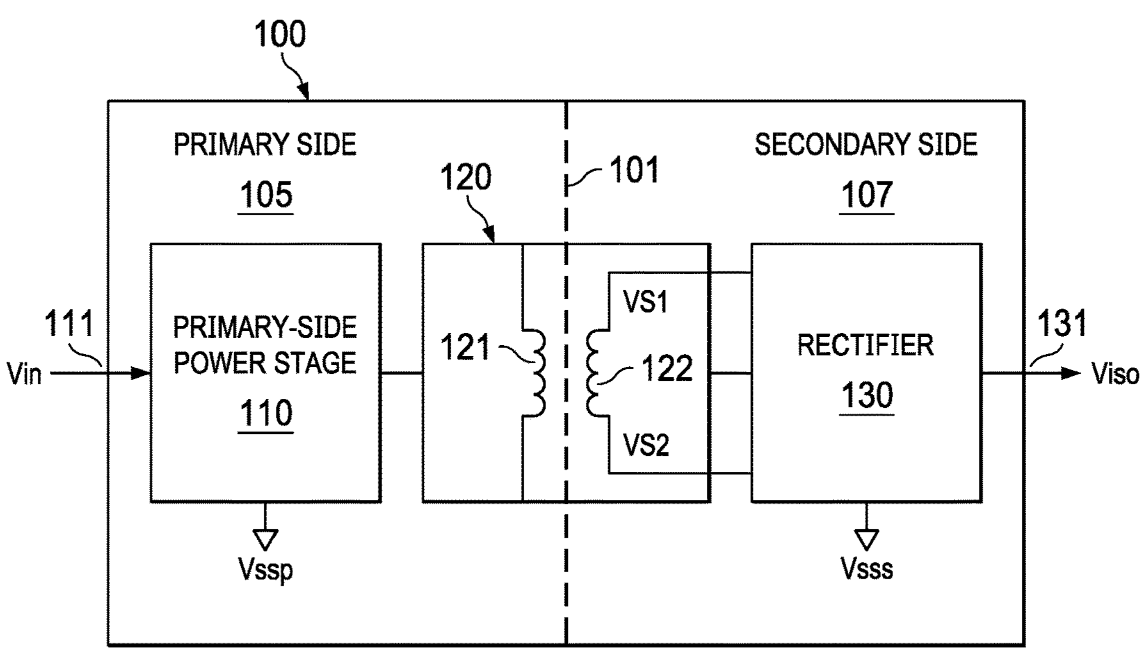
FIG. 1 is a block diagram of an isolated power converter having a rectifier in accordance with an example.

The example embodiments described herein are directed to an isolation power converter. In one example, the power converter is an isolation power converter including a transformer that isolates a "primary" side from a "secondary" side of the converter. The isolation converter is configured to convert an input direct current (DC) voltage received on the primary side to a same or different DC voltage on the secondary side using the transformer. The primary side includes a power stage that may include a switch network that receives the DC input voltage and produces a time-varying voltage to the primary winding of the transformer. The time-varying voltage on the primary winding of the transformer induces a time-varying current/voltage in the secondary winding of the transformer. The secondary side includes a rectifier to convert the time-varying current/voltage from the secondary winding to an approximately DC output voltage. The DC output voltage may have some degree of ripple within the specifications for the application of the power converter. Because the converter is an isolation power converter, the output voltage is referred to herein as an isolation output voltage Viso.

The rectifier on the secondary side has a resonant capacitance. In one example, the resonant capacitance is a parasitic capacitance. In one embodiment, the rectifier includes a conventional four-diode, full-bridge rectifier. In that case, the parasitic capacitance of the diodes contributes to the parasitic resonant capacitance of the rectifier. In other examples, the resonant capacitance includes a physical capacitor, or may be a combination of the capacitance of a physical capacitor and parasitic capacitance.

The magnitude of the power transfer through the converter is influenced by, among other things, the inductance of the transformer's primary and secondary windings, the resonant capacitance, and the switching frequency of the primary side power stage (described below). In one embodiment, the isolated power converter is an "integrated" isolated power converter meaning that the components of the converter including the transformer are formed as an integrated circuit on the same semiconductor die. That being the case, the transformer is small and thus the inductance of its windings is relatively small and its coupling coefficient is also relatively small. That the transformer may be a relatively poor performance transformer can be compensated by switching at higher frequencies and by implementing a desired magnitude of the resonant capacitance. Also, to the extent that a circuit to implement the rectifier has a relatively large common mode voltage, the converter may have relatively poor electromagnetic interference (EMI) performance because the common mode voltage causes the isolated ground planes on the primary and secondary side to radiate electromagnetic energy. The embodiments described herein provide example implementations of the rectifier 130 to reduce EMI while achieving a desired resonant capacitance.

FIG. 1 is a block diagram of an isolated power converter 100 in accordance with an example embodiment. The isolated power converter 100 has a primary side 105 and a secondary side 107. The isolated power converter 100 includes a transformer 120 which is operable as an isolation transformer to galvanically isolate the primary side 105 from the secondary side 107. The dashed line 101 delineates the primary side 105 from the secondary side 107. No electrical connection is present between the primary and secondary sides. The terms "primary" and "secondary" refer to the primary and secondary inductors of the transformer.

The primary side 105 includes a voltage input 111. The DC input voltage provided to the voltage input 111 is Vin. The secondary side 107 includes a voltage output 131. The isolated output voltage from the voltage output 131 is Viso. The primary side 105 includes a primary-side power stage 110. The secondary side 107 includes a rectifier 130. The primary side 105 has a ground Vssp. The secondary side 107 has a ground Vsss. The grounds Vssp and Vsss are isolated from each other.

Figure 2:
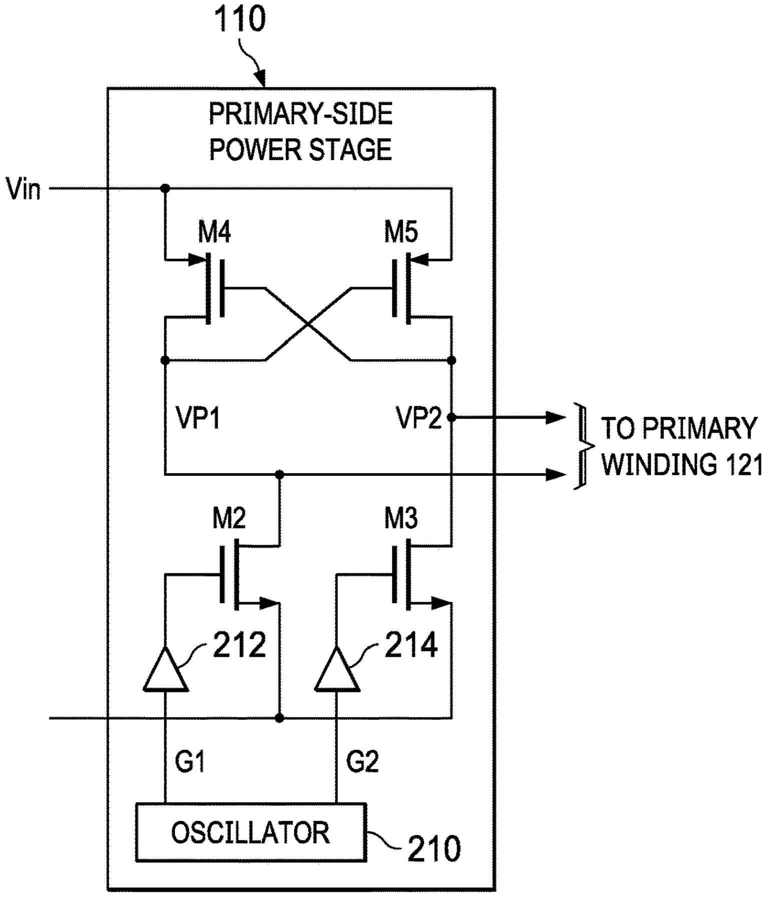
FIG. 2 is a schematic diagram of a primary-side power stage of the power converter of FIG. 1 in accordance with an example.

The transformer 120 has a primary winding 121 and a secondary winding 122. The primary-side power stage 110 receives Vin and the output of the primary-side power stage is coupled to the primary winding 121 of the transformer 120. The rectifier 130 is coupled to terminals VS1 and VS2 of the secondary winding 122 of the transformer 120, and generates the isolated output voltage Viso. A voltage Vin provided to the primary-side power stage 110 results in an isolated output voltage Viso being generated by the rectifier 130. The voltages Vin and Viso do not share the same ground and are galvanically isolated from each other. FIG. 2 (described below) provides an example implementation of the primary-side power stage 110.

FIG. 2 is a circuit schematic depicting one embodiment for the implementation of the primary-side power stage 110 in FIG. 1. In this example, the primary-side power stage 110 includes transistors M2-M5, gate drivers 212 and 214, and oscillator 210. Transistors M2 and M3 are N-channel metal oxide semiconductor field effect transistors (NFETs). Transistors M4 and M5 are P-channel metal oxide semiconductor field effect transistors (PFETs). Transistors M4 and M5 are cross-coupled with the gate of each transistor coupled to the drain of the other transistor. The sources of transistors M4 and M5 are coupled together and to Vin. The drains of transistors M4 and M2 are coupled together, and the drains of transistors M5 and M3 are coupled together. The connection between the drains of transistors M4 and M2 is a switch node (also referred to as a "switch terminal") labeled VP1. The connection between the drains of transistors M5 and M3 is a switch node labeled VP2. The sources of transistors M2 and M3 are coupled together and to ground VSSP.

Transistor M4 is driven by the voltage of switch node VP2, and transistor M5 is driven by the voltage of switch node VP1. Transistors M2 and M3 are actively driven by oscillator 210. Oscillator 210 generates oscillation signals G1 and G2. Oscillation signal G1 is coupled to the gate of transistor M2 via gate driver 212. Oscillation signal G2 is coupled to the gate of transistor M3 via gate driver 214. When oscillation signal G1 is high (and, accordingly, transistor M2 is on), oscillation signal G2 is low (and, accordingly, transistor M3 is off). Similarly, when oscillation signal G2 is high (and transistor M3 is on), oscillation signal G1 is low (and transistor M2 is off). The oscillator 210 implements a "dead time" (DT) after turning off one transistor and before turning on the other transistor to ensure that both transistors are not on at the same time. In another embodiment, rather than transistors M4 and M5 being cross-coupled to each other, transistors M4 and M5 can be actively driven by oscillator 210.

Figure 3:
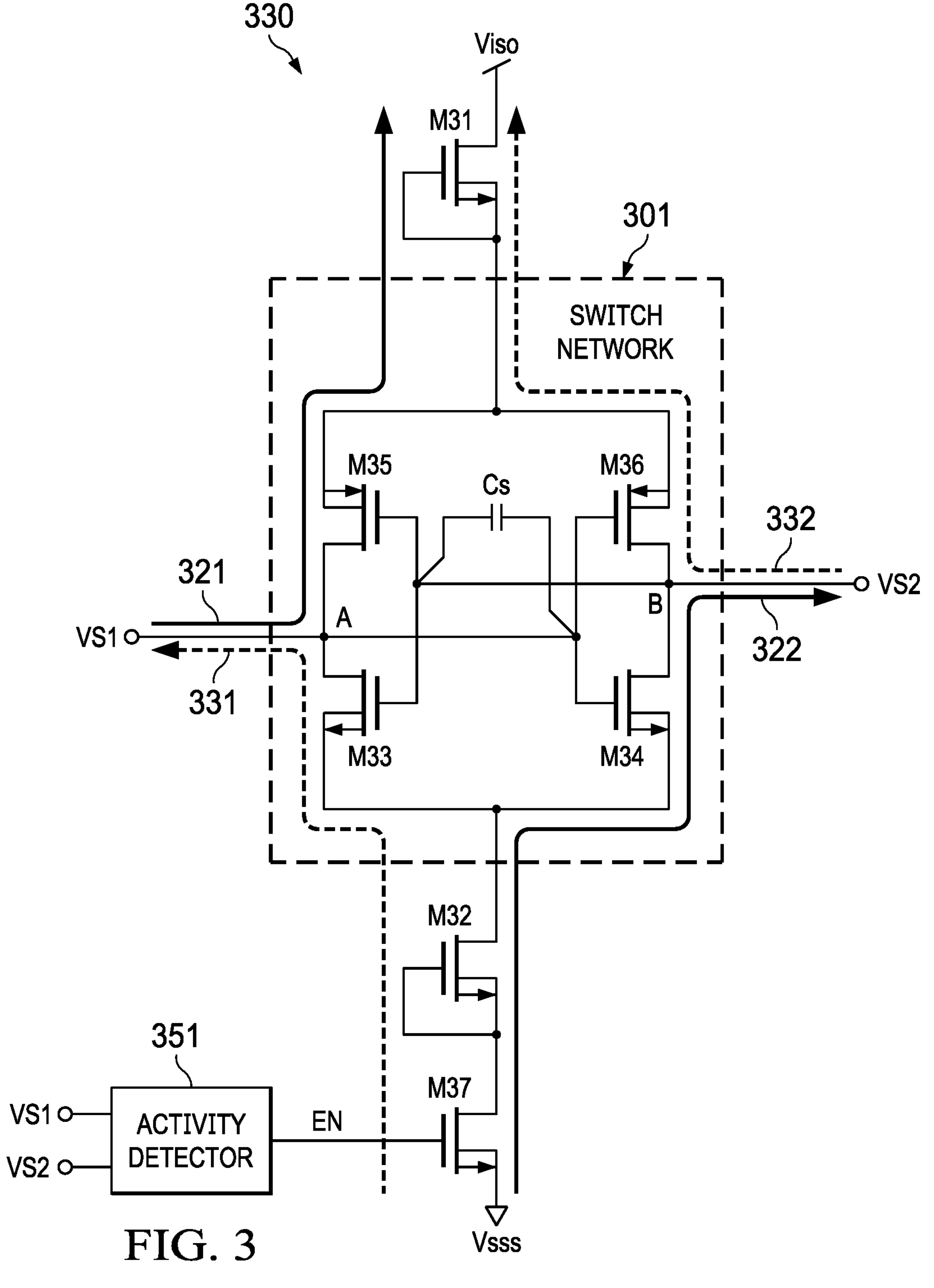
FIG. 3 is a circuit schematic of a rectifier usable to implement the rectifier of the power converter of FIG. 1.

FIG. 3 is a circuit schematic of a rectifier 330 that can be used to implement rectifier 130 of FIG. 1. In this example, rectifier 330 includes diode-connected transistors M31 and M32, a switch network 301, and an enable transistor M37. The switch network 301 includes transistors M33-M36. Transistors M31-M34 and M37 are N-channel metal oxide semiconductor field effect transistors (NFETs). Transistors M35 and M36 are PFETs.

The drain of M31 provides the output voltage Viso which is referenced to Vsss on the source of M37. The gate and source of M31 are coupled together so that M31 is implemented as a diode-connected transistor. The source of M31 is coupled to the sources of M35 and M36. The drains of M35 and M33 are coupled together at node A, and also coupled to the gates of M34 and M36. The drains of M36 and M34 are coupled together at node B, and also coupled to the gates of M33 and M35. Terminal VS1 of the secondary winding 122 is coupled to node A and thus to the drains of M33 and M35 and to the gates of M34 and M36. Terminal VS2 of the secondary winding 122 is coupled to node B and thus to the drains of M34 and M36 and to the gates of M33 and M35.

The sources of M33 and M34 are coupled together and to the drain of M32. The gate and source of M32 are coupled together so that M32 is implemented as a diode-connected transistor. The source of M32 is coupled to the drain of M37. The gate of M37 is configured to receive an enable (EN) control signal from an activity detector circuit 351 to turn M37 on and off. Turning M37 on causes the rectifier 330 (and thus the converter) to be operational (on). Turning M37 off causes the rectifier 330 (and thus the converter) to be non-operational (off). The activity detector circuit 351 is coupled to the terminals VS1 and VS2. The activity detector circuit detects the absence of switching voltages on terminals VS1 and VS2 and responds to that detection by controlling the EN control signal to turn off M37 (EN is low in this example to turn off M37). The activity detector circuit 351 asserts the EN control signal high (to turn on M37) responsive to the detection of switching voltages on either or both of terminals VS1 and VS2.

If rectifier 130 was implemented as a conventional four-diode, full-bridge rectifier, the forward voltage drop of the diodes of such a rectifier would contribute to a reduction in the power efficiency of the converter. For example, the forward voltage drop of a diode may be 700 millivolts (mV). With two diodes being on during each half-cycle of the time-varying voltage produced by the secondary winding 122 of the transformer, the total voltage drop by the rectifier itself would be 1.4V leading to substantial power dissipation in the diodes themselves. However, in the embodiment of FIG. 3, diode-connected transistors M31 and M32 are low voltage threshold (LVT) transistors. For example, the threshold voltage (Vt) of M31 and M32 may be approximately 150 mV, and thus substantially less than 700 mV of a conventional diode diode-connected transistor. That M31 and M32 are LVT transistors results in the converter that uses rectifier 330 being more efficient than if a conventional four-diode, full-bridge rectifier was used. M33-M36 of the switch network 301 are higher voltage transistors (e.g., 5V devices). Accordingly, M33-M36 protect the LVT transistors M31 and M32 for Viso applications that exceed the voltage rating of M31 and M32.

During operation, when VS1 is greater than VS2, M34 and M35 are on and M33 and M36 are off. In this state, current flows in the direction of solid arrows 321 and 322, which is, from VS1 through M35 and M31 to Viso, and also from Vsss and through M37, M32, and M34 to VS2. When VS2 is greater than VS1, M33 and M36 are on and M34 and M35 are off. In this state, current flows in the direction of dashed arrows 331 and 332, which is from Vsss and through M37, M32, and M33 to VS1, and also from VS2 through M36 and M31 to Viso.

The gate signals for the switching transistors M33-M36 of the switch network 301 are from the secondary winding 122 of the transformer, and a dedicated control circuit and drivers not required. Further, rectifier 330 is a full-bridge rectifier but only includes two diodes (diode-connected transistors M31 and M32). The switch network 301 is configured to control the flow of current through the diode-connected transistors M31 and M32 during both half-cycles of the voltage across the secondary winding 122.

Capacitor Cs represents the resonant capacitance of the rectifier 330. The resonant capacitance Cs in the embodiment of rectifier 330 includes the combined parasitic capacitances of M33-M36 and thus can be relatively large. Thus, rectifier 330 may be useful when a large resonant capacitance for an isolated quasi-resonant power converter is desired. A large resonant capacitance may be useful for higher power applications (e.g., 1 watt or higher) in which lower switching frequencies are needed for the primary-side power stage 110. Further, rectifier 330 has no significant reverse recovery problems.

LVT transistors M31 and M32, unfortunately, may have leakage current which is higher than is desired. Accordingly, enable transistor M37 can be turned off to reduce leakage current from rectifier 330 when the converter is intended to be off anyway. When the converter is to be turned on, EN is asserted high to turn on enable transistor M37.

Figure 4:
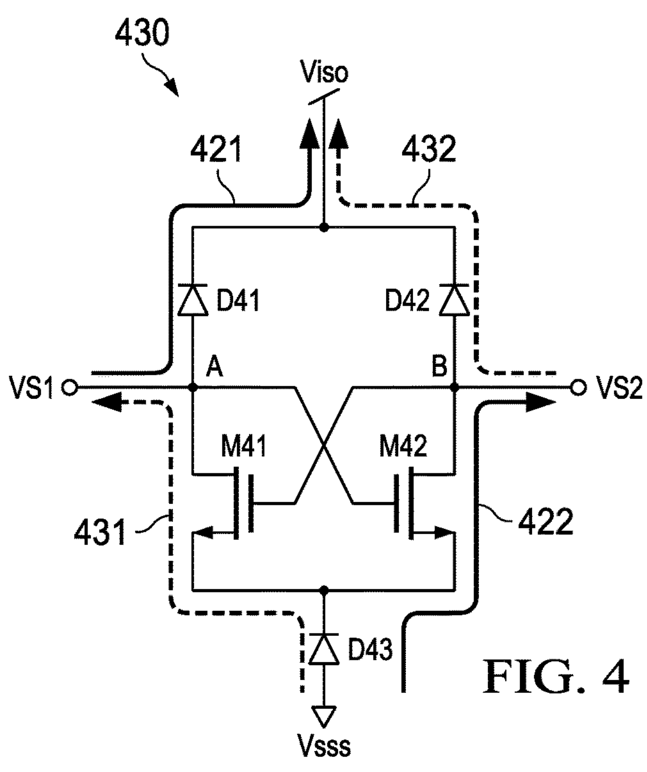
FIG. 4 is a circuit schematic of another rectifier usable to implement the rectifier of the power converter of FIG. 1.

FIG. 4 is a circuit schematic of a rectifier 430 that can be used to implement rectifier 130 of FIG. 1. In this example, rectifier 430 includes diodes D41, D42, and D43 and transistors M41 and M42. Transistors M41 and M42 are NMOS transistors in this example. In one embodiment, diodes D41 and D42 are implemented as 5V, PFET diode-connected transistors, which have low leakage current. In this example, diode D43 is implemented as an LVT (e.g., 1.8V) diode-connected transistor. Thus, diode D43 is implemented as a lower voltage rated transistor than diodes D41 or D42 or transistors M41 and M42.

The cathodes of diodes D41 and D42 are coupled together and provide the output voltage Viso. The anode diode D41 is coupled to the drain of M41 at node A. The anode diode D42 is coupled to the drain of M42 at node B. M41 and M42 are cross-coupled in that the gate of M41 is coupled to the drain of M42 (and thus to the anode of D42), and the gate of M42 is coupled to the drain of M41 (and thus to the anode of D41). VS1 from the secondary coil is coupled to the node A and VS2 is coupled to node B.

As with the embodiment of FIG. 3, rectifier 430 includes two diodes for implementing a full-bridge rectifier and uses M41 and M42 to switch the direction of current flow for the positive and negative half-cycles of the time-varying voltage from the secondary winding being rectified. During operation, when VS1 is greater than VS2, M42 is on and M41 is off. In this state, current flows in the direction of solid arrows 421 and 422, which is from VS1 and through D41 to Viso, and also from Vsss and through diode D43 and transistor M41 to VS1. When VS2 is greater than VS1, M41 is on and M42 is off. In this state, current flows in the direction of dashed arrows 431 and 432, which is from Vsss through M41 to VS1, and also from VS2 through diode D42 to Viso.

Because PFET diode-connected transistors implementing diodes D41 and D42 have low leakage current, rectifier 430 omits an enable/disable switch (e.g., M37 in FIG. 3). The 5V, cross-coupled transistors M41 and M42 provide cascode-protection for the lower voltage diode D43 which is implemented as an LVT transistor.

The rectifier 430 of FIG. 4 has relatively low total capacitance and thus provides relatively low resonant capacitance for the secondary side of the isolation converter. Accordingly, rectifier 430 may be well-suited for low power applications (e.g., 100 mW). The power efficiency of rectifier 430 may be lower than that of rectifier 330. Rectifier 330 may have a higher power efficiency but also has a higher resonant capacitance which is useful for higher power applications. Rectifier 430 may be useful for lower power applications but may be characterized by a lower efficiency than for rectifier 330.

Figure 5:
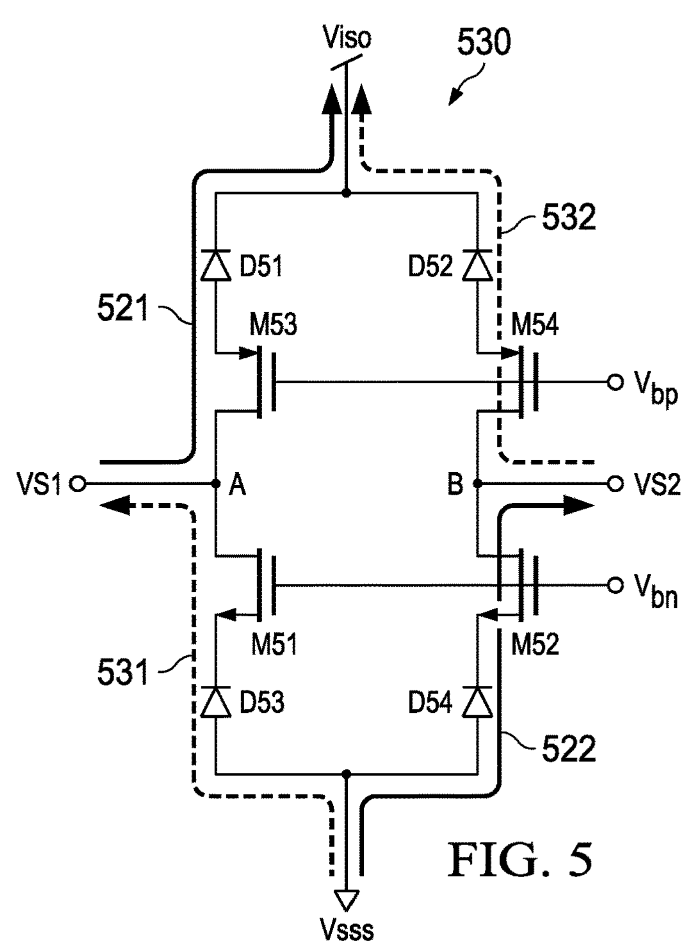
FIG. 5 is a circuit schematic of yet another rectifier usable to implement the rectifier of the power converter of FIG. 1.

FIG. 5 is a circuit schematic of a rectifier 530 that can be used to implement rectifier 130 of FIG. 1. In this example, rectifier 530 includes diodes D51-D54 and transistors M51-M54. In this example, diodes D51-D54 are implemented as LVT (e.g., 1.8V) diode-connected transistors. Transistors M51-M54 are implemented as higher voltage (e.g., 5V) transistors. M51 and M52 are NFETs in this example, and M53 and M54 are PFETs.

The cathodes of diodes D51 and D52 are coupled together and provide the output voltage Viso. The anode of D51 is coupled to the source of M53. The drains of M53 and M51 are coupled together at node A (which is coupled to VS1). The source of M51 is coupled to the cathode of D53, and the anode of D53 is coupled to Vsss. The anode of D52 is coupled to the source of M54. The drains of M54 and M52 are coupled together at node B (which is coupled to VS2). The source of M52 is coupled to the cathode of D54, and the anode of D54 is coupled to Vsss.

The gates of PFETs M53 and M54 are coupled together and receive a bias voltage Vbp sufficient to maintain M53 and M54 in an "on" (saturation region) state. Similarly, the gates of NFETs M51 and M52 are coupled together and receive a bias voltage Vbn sufficient to also maintain M51 and M52 in an "on" (saturation region) state.

During operation, when VS1 is greater than VS2, current flows in the direction of solid arrows 521 and 522, which is, from VS1 through M53 and diode D51 to Viso, and also from Vsss through diode D54 and transistor M52 to VS2. When VS2 is greater than VS1, current flows in the direction of dashed arrows 531 and 532, which is from Vsss through diode D53 and transistor M51 to VS1, and also from VS2 through transistor M54 and diode D52 to Viso.

Higher voltage transistors M51-M54 protect the lower voltage diodes D51-D54. The capacitance provided by rectifier 530 is fairly low and thus rectifier 530 is particularly useful for low power applications (e.g., 100 mW). The power efficiency of rectifier 530 is approximately the same as that of rectifier 330 (FIG. 3) and is higher than the power efficiency of rectifier 430.

Figure 6:
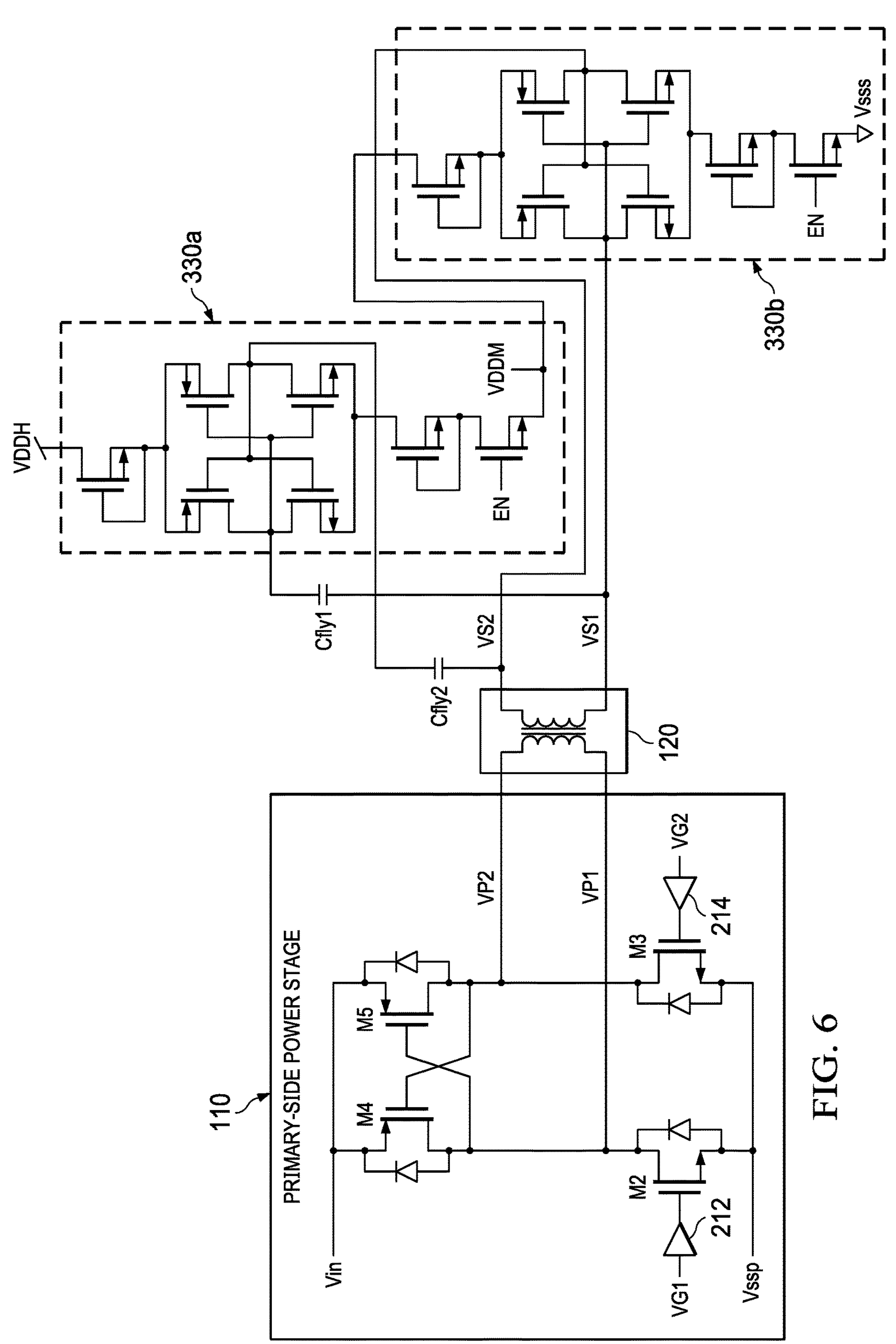
FIG. 6 is a schematic of a power converter in which the primary side power stage is coupled to the primary winding of transformer, and the secondary winding of the transformer is coupled to stacked rectifiers by way of flyback capacitors in accordance with an example.

The rectifiers 330, 430, and 530 can be "stacked" to provide higher levels of output voltage. FIG. 6 shows an example in which the primary side power stage is coupled to the primary winding of transformer 120, and the secondary winding of the transformer 120 is coupled to stacked rectifiers 330*a* and 330*b* by way of flyback capacitors Cfly1 and Cfly2. Rectifier 330*a* is substantially the same as rectifier 330 of FIG. 3. Similarly, rectifier 330*b* also is substantially the same as rectifier 330 of FIG. 3. The output voltage from the converter is VDDH relative to Vsss. That voltage is double the output voltage of each rectifier 330*a* and 330*b* because the rectifiers 330*a* and 330*b* are connected in series. Any of the rectifiers described herein can be stacked in series. Also, the output voltages of the rectifiers (VDDH and VDDM) can be used independently to source power to a load.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device which is "configured to" perform a task or function may be configured (e.g., programmed and/or hard-wired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node", "interconnection," "pin," and "lead" are used interchangeably. Unless specifically stated to the contrary, these terms are generally used to mean an interconnection between or a terminus of a device element, a circuit element, an integrated circuit, a device or other electronics or semiconductor component.

A circuit or device which is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead. For example, a PFET may be substituted in place of an NFET with little or no changes to the circuit. Furthermore, other types of transistors may be used (such as bipolar junction transistors (BJTs)).

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value.

Modifications are possible in the described embodiments, and other embodiments are possible, within the scope of the claims.

What is claimed is:

1. An apparatus, comprising:

a first diode-connected transistor coupled to a first power terminal;

a second diode-connected transistor coupled to a second power terminal;

a switch network having a first switch terminal, a second switch terminal, a third switch terminal, and a fourth switch terminal, the first switch terminal coupled to the first diode-connected transistor, the second switch terminal coupled to the second diode-connected transistor, the switch network configurable to:

in a first mode, allow a first current to flow from the third switch terminal through the first diode-connected transistor to the first power terminal and from the second power terminal through the second diode-connected transistor to the fourth switch terminal; and in a second mode, allow a second current to flow from the fourth switch terminal through the first diode-connected transistor to the first power terminal and from the second power terminal through the second diode-connected transistor to the third switch terminal; and a switch coupled between the second diode-connected transistor and the second power terminal.

2. The apparatus of claim 1, wherein the switch network includes third and fourth transistors of a first doping type and fifth and sixth transistors of a second doping type.

3. The apparatus of claim 2, wherein:

the third transistor is coupled between the first and third switch terminals;

the fourth transistor is coupled between the first and fourth switch terminals;

the fifth transistor is coupled between the third and second switch terminals;

the sixth transistor is coupled between the fourth and second switch terminals;

a gate of the third transistor and a gate of the fifth transistor are coupled to the fourth switch terminal; and a gate of the fourth transistor and a gate of the sixth transistor are coupled to the third switch terminal.

4. The apparatus of claim 1, wherein the switch network includes transistors, and the first diode-connected transistor and the second diode-connected transistor have lower threshold voltages than at least some of the transistors of the switch network.

5. The apparatus of claim 1, wherein in the first and second modes, a first voltage across the first diode-connected transistor and a second voltage across the second diode-connected transistor are less than a voltage difference between the first and second power terminals.

6. The apparatus of claim 1, wherein the first and second diode-connected transistors and the switch network are part of a rectifier.

7. The apparatus of claim 1, wherein the first switch terminal is coupled to a first inductor terminal, and the second switch terminal is coupled to a second inductor terminal.

8. The apparatus of claim 7, further comprising a transformer including a primary winding and a secondary winding, the secondary winding being coupled between the first and second inductor terminals.

9. The apparatus of claim 1, further comprising a detection circuit coupled between the third and fourth switch terminals and a control terminal of the switch.

10. The apparatus of claim 1, wherein the first and second diode-connected transistors are low voltage threshold (LVT) transistors with threshold voltages less than 700 mV.

11. An apparatus, comprising:

a transformer having a primary winding and a secondary winding, the secondary winding having first and second secondary winding terminals;

a power stage coupled to the primary winding; and a rectifier including:

a first rectifying device coupled to a first power terminal;

a second rectifying device coupled to a second power terminal;

a switch network having a first switch terminal, a second switch terminal, a third switch terminal, and a fourth switch terminal, the first switch terminal coupled to the first rectifying device, the second switch terminal coupled to the second rectifying device, the secondary winding coupled between the third and fourth switch terminals, the switch network configurable to:

in a first mode, allow a first current to flow from the third switch terminal through the first rectifying device to the first power terminal and from the second power terminal through the second rectifying device to the fourth switch terminal; and in a second mode, allow a second current to flow from the fourth switch terminal through the first rectifying device to the first power terminal and from the second power terminal through the second rectifying device to the third switch terminal; and a switch coupled between the second rectifying device and the second power terminal.

12. The apparatus of claim 11, wherein the first rectifying device includes a first diode-connected transistor, and the second rectifying device includes a second diode-connected transistor.

13. The apparatus of claim 12, wherein:

in the first and second modes, a first voltage across the first diode-connected transistor and a second voltage across the second diode-connected transistor are less than a voltage difference between the first and second power terminals.

14. The apparatus of claim 12, wherein the switch network includes transistors, and the first diode-connected transistor and the second diode-connected transistor have lower threshold voltages than at least some of the transistors of the switch network.

15. The apparatus of claim 11, wherein the switch network includes first and second transistors of a first doping type and third and fourth transistors of a second doping type.

16. The apparatus of claim 15, wherein:

the first transistor is coupled between the first and third switch terminals;

the second transistor is coupled between the first and fourth switch terminals;

the third transistor is coupled between the third and second switch terminals;

the fourth transistor is coupled between the fourth and second switch terminals;

a gate of the first transistor and a gate of the third transistor are coupled to the fourth switch terminal; and a gate of the second transistor and a gate of the fourth transistor are coupled to the third switch terminal.

17. The apparatus of claim 11, further comprising a detection configured to control the switch based on at least one of a voltage signal at the third switch terminal or a voltage signal at the fourth switch terminal.

* * * * *